Sept. 20, 1971   J. WARSHAWSKY ET AL   3,605,655
METHOD AND APPARATUS FOR INCINERATING COMBUSTIBLE WASTES
Filed May 5, 1970
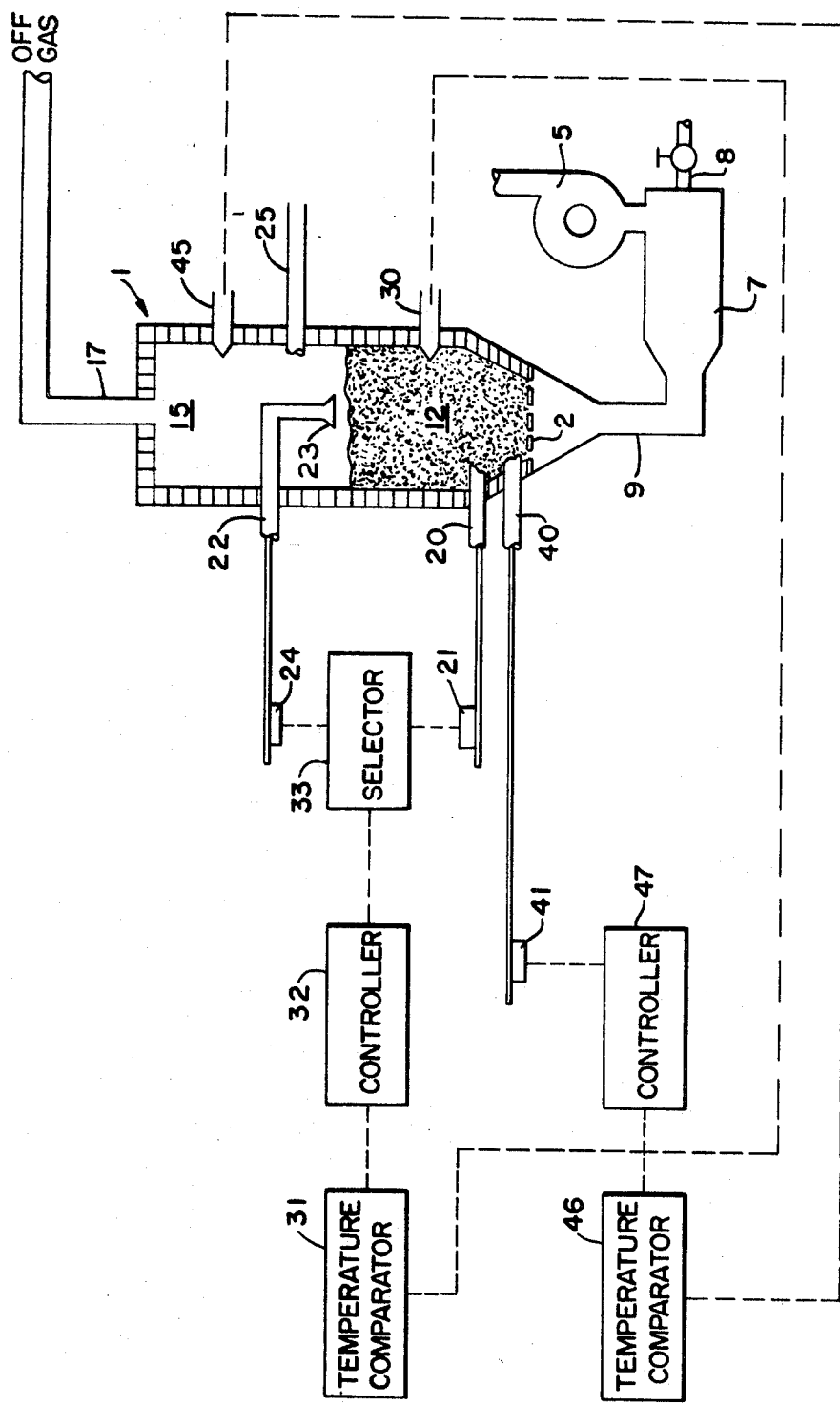
INVENTOR
JAY WARSHAWSKY &
LOUIS H. PIPER
BY Frank H. Thomson
Jack L. Prather
ATTORNEY

United States Patent Office 3,605,655
Patented Sept. 20, 1971

3,605,655
METHOD AND APPARATUS FOR INCINERATING COMBUSTIBLE WASTES
Jay Warshawsky, Allentown, Pa., and Louis H. Piper, Tucson, Ariz., assignors to Fuller Company
Filed May 5, 1970, Ser. No. 34,829
Int. Cl. F23g 5/08
U.S. Cl. 110—8R                                    12 Claims

ABSTRACT OF THE DISCLOSURE

A control system for a fluidized bed reactor which is used for treating material. Although the control system is primarily designed for use with a reactor which is used for incinerating combustible wastes such as sewage sludge, oily wastes such as oily wastes from an oil refining operation or other combustible wastes, it may also be used with a reactor which is being used for other high temperature operations such as calcining operations. Fuel and quench water are supplied to the reactor to maintain a desired temperature within the fluidized bed. The temperature of the fluidized bed is measured and compared to a set temperature. The difference between the actual temperature of the fluidized bed and the desired temperature controls the supply of either fuel or quench water to the reactor to maintain the actual temperature of the bed equal to the desired temperature. The temperature of the freeboard area above the fluid bed is also measured and compared with a desired temperature. A controller responsive to the difference between the desired temperature of the freeboard area and the actual temperature controls the volume of wastes supplied to the reactor.

BACKGROUND OF THE INVENTION

The present invention relates to fluidized bed reactors and in particular to a control system for such reactors. The control is particularly adapted for use in a reactor used for incinerating combustible wastes.

The use of a fluidized bed reactor for incinerating combustible wastes has become more widely accepted in recent years. As an incinerator, a fluidized bed reactor has the advantage of the ability to maintain a temperature sufficient to accomplish complete incineration of combustible wastes and eliminates the objectionable odors often associated with such incineration.

One problem encountered in incinerating wastes is that the wastes which are fed into the incinerator are not entirely combustible wastes. For example, if the wastes to be disposed of are the oily wastes from an oil refining process or the cutting fluids used in machining operations or sewage sludge, the combustible wastes are mixed with a high percentage of water and noncombustible materials. The combustible materials maintain the temperature of the fluidized bed, but the noncombustibles reduce the temperature. If the combustible material portion of the waste material remained constant, control of the reactor would be a relatively easy matter. Unfortunately, the concentration of combustible material in the wastes rarely, if ever, remains constant. It is, therefore, necessary to have a reactor control system which will permit the feeding of wastes to the reactor regardless of the concentration of combustible material in the waste.

The primary purpose of the reactor is to insure complete combustion of the wastes and the elimination of objectionable odors associated with that combustion. Of secondary importance is the rate at which the wastes are incinerated. In order to obtain complete combustion of the wastes, it is necessary to keep the reactor operating at a certain temperature, which temperature will depend upon the type of material being incinerated. In order to maintain this temperature, sufficient fuel must be added to the reactor to overcome heat losses in the reactor due to radiation and the quenching effect of the noncombustible portion of the waste added to the reactor. This fuel added to the reactor may be in the form of combustible wastes or auxiliary fuel or both. On the other hand, in keeping with the primary purpose of insuring complete combustion of the wastes which are fed into the reactor, it is essential that the amount of fuel added to the reactor be no greater than the amount of fuel which can be burned by the available oxygen in the reactor.

The problems associated with controlling the supply of wastes to the reactor should be obvious. If the wastes contain a high percentage of combustible material, the amount of fuel supplied to the reactor will exceed the amount of available oxygen and complete combustion will not take place. If the wastes contain a low percentage of combustible wastes and thus a high percentage of noncombustibles, the temperature of the reactor may drop below that required to obtain complete combustion of the waste.

Prior apparatus for controlling the supply of wastes to the reactor are known. One such apparatus is shown in U.S. Pat. No. 3,366,080. This apparatus relies on controlling the length of time the waste material is retained in the reactor. The control is responsive to the temperature of and the amount of oxygen in the gases exhausted from the reactor. The system includes a recirculation system and relies on interaction between the supply of waste material to the reactor, the supply of fluidizing air to the reactor and the temperature of the fluidized bed. It is believed that such an arrangement is unduly complex and not altogether satisfactory.

If the material to be treated in the reactor is a noncombustible such as in calcining lime, it is important to maintain a particular temperature in the bed in order to insure a complete reaction. If the material feed is too high, the temperature in the fluidized bed will drop. An increase in fuel supply may result in undesired burning above the bed.

In some instances, the material to be treated may contain some combustible materials, but the purpose in treating these materials in the fluidized bed is not incineration. An example of such a material is oily lime shale where the shale is to be used in a cement making process. In the event the heat value of the shale varies, it is essential to control the feed of fuel and shale to the reactor to maintain proper temperature in the reactor.

SUMMARY

It is, therefore, the principal object of this invention to provide a novel control system for a reactor which is used in treating materials.

It is another object of this invention to provide a control system for a fluidized bed reactor in which complete incineration of the combustible wastes is assured.

It is another object of this invention to provide a control system for a fluidized bed reactor for combustible waste material which operates at the highest feed rate of waste which is compatible with complete combustion.

It is a further object of this invention to provide a reactor for combustible waste material which eliminates process upsets due to variations of waste composition.

In general, the foregoing and other objects will be carried out by providing a reactor for treating material comprising: a housing defining a chamber; a grid plate mounted within said chamber; granular material disposed within said chamber above said grid plate; means for generating heat within the reactor; means for blowing air through granular material for fluidizing said granular material within said chamber whereby a freeboard area is provided within said chamber above the fluidized bed; first temperature measuring means for measuring the temperature of said fluidized bed; means responsive to the temperature of said fluidized bed for controlling the temperature of said fluidized bed; second temperature measuring means for measuring the temperature of the freeboard area; means for feeding material to be treated into said chamber; and means responsive to the temperature of said freeboard area for controlling the rate of feed of material to be treated supplied to said chamber. The method of the present invention is carried out by providing a combustion chamber containing granular material; blowing a continuous supply of air into said granular material to provide a fluidized bed of granular material whereby a freeboard area is provided within said chamber above the fluidized bed; supplying fuel to the fluidized bed for combustion therein; supplying wastes to the chamber; measuring the temperature of the freeboard area; and controlling the volume of wastes supplied to the chamber in response to the temperature of the freeboard area.

The means for generating heat within the reactor may consist of fuel, a combustible waste to be incinerated, a material to be treated in some way other than by incineration but which contains some combustibles or a combination of fuel and combustible wastes or fuel and material containing some combustibles.

BRIEF DESCRIPTION OF THE DRAWING

The invention will be described in connection with the annexed drawing wherein the single figure is a diagrammatic illustration of the reactor control system of the present invention.

DESCRIPTION OF THE PREFERRED EMBODIMENT

Referring to the drawing, there is shown a fluidized bed reactor generally indicated at 1. The reactor is of a well-known type and includes a grid plate 2 mounted within the chamber defined by the reactor 1. Granular refractory material such as sand is disposed within the reactor 1 above the grid 2. A blower 5 supplies air through a heater 7 and inlet pipe 9 to the underside of the grid plate 2. The air is blown through the granular material to fluidize the material and form a fluidized bed 12. A freeboard area 15 is provided above the fluidized bed 12 as is generally known in the art. A conduit 17 is provided in the top of the reactor 1 for exhausting gases from the reactor 1. Gases which are exhausted through conduit 17 may be conducted to a suitable cooling and filtering system (not shown) and then exhausted to atmosphere. If desired, the conduit 17 can be connected to a suitable heat exchanger for preheating the air supplied to conduit 9.

In order to obtain complete combustion of the wastes and eliminate undesirable odors, it is necessary to maintain a certain temperature within the reactor and in particular within the fluidized bed where primary combustion takes place. For most applications, it is believed that this temperature will be in the range of 1400° to 1800° F. In order to achieve the desired temperature, herein referred to as the "set point," fluidizing air is blown through heater 7 which is supplied with fuel from conduit 8 to provide hot air to the reactor 1 and fluidize the bed 12. When the bed reaches a temperature capable of supporting combustion, fuel is supplied directly to the fluidized bed 12 through a supply conduit 20 from a suitable source (not shown). As fuel burns within the bed 12, the temperature of the bed quickly rises to the set point.

A quench water supply conduit 22, having a spray head 23, is provided for spraying water on the surface of the fluidized bed for reducing the temperature of the bed in the event it exceeds the set point, as during the burning of waste with substantial fuel content.

A suitable control system is provided for maintaining the desired temperature of the bed 12. A thermocouple temperature measuring unit 30 is mounted in the reactor 1 for measuring the temperature of the bed 12. The temperature measuring unit 30 sends an electrical signal to a temperature comparator 31 where the actual temperature of the fluidized bed 12 is compared with the set point. The comparator sends a signal to a controller 32 which in turn sends a signal to a selector 33. If the temperature in the bed 12 is less than the set point, the selector 33 is such that it first sends a signal to a valve 24 to decrease the supply of quench water to the bed 12 which results in an increase in bed temperature. If the quench water supply is zero, a temperature decrease causes a signal to be sent to valve 21 to increase the supply of fuel to the reactor. If the temperature of the bed 12 is greater than the set point, the selector 33 first sends a signal to valve 21 to decrease the supply of fuel through line 20 unless the fuel supply is at zero in which case the selector 33 sends a signal to valve 24 in water supply conduit 22 to increase the supply of quench water to the reactor. Thus, a relatively simple control system has been provided for maintaining the temperature of the bed at a level which will insure complete combustion of wastes and elimination of odors. The control system may be either electrical or fluid pressure operated.

A waste supply conduit 40 is connected to the reactor so that wastes to be incinerated are conducted directly into the fluid bed 12. The conduit 40 is supplied with wastes from a suitable source (not shown). It is important to feed wastes to the reactor at as high a rate as possible within the limits of obtaining complete combustion. Complete combustion of wastes is insured by maintaining the temperature of the reactor at the set point and by insuring that there is sufficient oxygen available in the reactor to burn all the fuel which has been fed to the reactor, whether the fuel is in the form of wastes through conduit 40 or auxiliary fuel through line 20.

If more fuel is supplied to the reactor than can be burned within the reactor, the excess fuel will escape the fluid bed 12 and will burn in the freeboard area 15, if there is oxygen available in the freeboard area. It is undesirable for the partially burned fuel to escape through the off gas pipe 17 since odors and smoke due to unburned hydrocarbon may result. Heretofore, it has been deemed undesirable to have combustion take place in the freeboard area. By the present invention, the amount of fuel, in the form of wastes or auxiliary fuel or both, supplied to the reactor is increased until a limited amount of combustion takes place within the freeboard area. This permits the maximum feed rate of wastes to the reactor within the limits of maintaining complete combusion. A limited quantity of air is continuously supplied to the freeboard area 15 through a supply conduit 25 to insure that any unburned fuel which leaves the bed 12 will be burned in the freeboard area. The supply conduit 25 is independent of the air for fluidizing the bed 12.

The amount of burning of fuel which takes place in the freeboard area 15 will affect the temperature of the freeboard area. By the present invention, the amount of burning which takes place in the freeboard area, as reflected by the temperature of the freeboard area, is used to control the amount of wastes supplied to the reactor. Although with the present invention it is desirable to have a certain amount of burning take place in the freeboard area, it is not desirable to have too much burning take place there. The desired amount of burning in the freeboard area will correspond to a particular desired temperature within the freeboard area, hereinafter referred to as the "freeboard set point." The freeboard set point will be somewhat higher than the set point of the bed 12. In the preferred form of the invention, the freeboard set point is about 100° F. higher than the set point of the bed 12. However, the difference is not critical and may range from zero to about 500° F. The limiting factor is that if the temperature in the freeboard area becomes too much higher than the temperature in the bed 12, all the burning will take place in the freeboard and none in the fluidized bed.

The actual temperature of the freeboard area is measured by a suitable thermocouple temperature measuring instrument 45 which sends an electrical signal to a temperature comparator where the actual temperature is compared to the freeboard set point. The comparator 46 sends a signal, either electric or fluid pressure to a controller 47 which in turn sends a signal to a valve means 41 which regulates the feed rate of wastes supplied to the reactor 1 through conduit 40.

If the temperature in the freeboard area is less than the freeboard set point, little or no above-bed burning is occurring and the heat value of the fuel supplied to the reactor is less than can be burned by the available oxygen in the fluid bed 12, i.e. all the fuel supplied to the fluid bed 12, in the form of either wastes or auxiliary fuel from line 20, is being burned in the bed 12. Therefore, additional fuel can be supplied to the fluid bed until some of the fuel escapes the bed and is burned in the freeboard area. Since the amount of burning which takes place in the freeboard area controls the feed rate of wastes to the reactor, then if the temperature in the freeboard is less than the freeboard set point, the controller 47 actuates valve 41 to supply an additional volume of wastes to the reactor. However, if the temperature in the freeboard area is greater than the freeboard set point, too much burning is taking place in the freeboard area. This means that more fuel is being supplied to the fluid bed than there is available oxygen in the bed. To overcome this condition, the controller actuates valve 41 to reduce the volume of waste material to the reactor.

It should be apparent from the foregoing that a simple control for a fluidized bed reactor has been provided. The temperature necessary to obtain complete combustion is controlled by one circuit and the volume of waste material is controlled by a second circuit so that the maximum amount of wastes are incinerated while insuring complete combustion.

A variation in the composition of the waste does not adversely affect the operation of the reactor. If the heat value of the waste increases, the temperature of the bed will increase because the effect of an increase in the heat value of the waste is the addition of more fuel to the reactor. This increase in temperature of the fluidized bed is measured by the temperature measuring means 30 which sends a signal to comparator 31. If the temperature of the bed is above the set point, a signal is sent through controller 32 to selector 33 which sends a signal to valve 21 to reduce the supply of fuel to the reactor through line 20, or a signal is sent to valve 24 to increase the supply of quench water to cool the bed to the set point. If the heat value of the wastes supplied through conduit 40 increases to such an extent that more fuel is being supplied to the reactor than can be burned within the fluid bed and the acceptable level of burning in the freeboard area, the temperature in the freeboard area will increase above the freeboard set point and a signal will be sent to valve 41 through controller 47 to decrease the supply of waste to the reactor.

If, on the other hand, the heat value of a fuel-rich waste decreases, the temperature of the fluidized bed 12 will decrease. This will result in less quench water being supplied to the reactor. The decrease in heat value of the fuel not only reduces the temperature of the fluid bed, but also will result in a decrease in temperature in the freeboard area. This is because most of the fuel will be burned within the fluid bed and little, if any, will escape to the freeboard area. This decrease in temperature in the freeboard area results in a signal being sent to valve 41 to increase the supply of waste to the reactor.

It may be that the heat value of the waste becomes so low that the addition of waste to the reactor has the effect of acting as quench water and reducing the temperature of the fluid bed 12. The control system of the present invention is able to handle this situation. The fluid bed temperature decrease first results in a reduction of the quench water until the supply of quench water is at zero, followed by an increase in fuel supply to the bed 12 through line 20. The fuel supply through line 20 will be increased until the set point is reached and complete combustion is assured.

It should be apparent from the foregoing that the objects of this invention have been carried out. A novel control system for a fluidized bed reactor has been provided which insures complete combustion of the wastes. Waste composition changes do not adversely affect the system and maximum feed rates compatible with complete combustion is maintained. The primary control is exercised by the bed temperature as this insures complete combustion and odor control; the freeboard temperature control loop is a secondary control loop in that the waste feed rate is maximized subject to the constraint of essentially full combustion in the fluidized bed.

The freeboard set point is preferably only slightly more than the set point of the bed 12. If desired, the temperature of the freeboard can be compared with the temperature of the bed and the difference between the two can be compared to a desired difference and the result of the second comparison used for controlling the feed of wastes.

The invention has been described as it would be applied to a fluidized bed reactor used in incinerating combustible wastes. It is to be understood, however, that the invention is applicable to fluidized bed reactors wherein the material to be treated is not a waste product and some reaction other than incineration is to be carried out in the reactor such as the calcining of lime.

It is intended that the foregoing be merely a description of a preferred embodiment and that the invention be limited solely by that which is within the scope of the appended claims.

We claim:

1. In combination with a reactor for treating material including a housing defining a chamber, a fluidized bed disposed within said chamber so that a freeboard area is provided within the chamber above the fluidized bed, means for generating heat within the reactor and means for feeding material to be treated into the reactor, apparatus for controlling the flow of material to be treated into the reactor comprising:

means for measuring the temperature of the freeboard area in the reactor; and means responsive to the temperature of the freeboard area for controlling the volume of material to be treated supplied to the reactor.

2. The combination of claim 1 wherein the reactor includes means for continuously supplying air directly into the freeboard area and said means responsive to the temperature of the freeboard area includes means for comparing the temperature of the freeboard area to a predetermined temperature and means responsive to the temperature comparing means for controlling the volume of material to be treated supplied to said reactor so that if the temperature in the freeboard area is greater than the predetermined temperature, the volume of material supplied to said reactor is decreased.

3. A reactor for treating material comprising:

a housing defining a chamber;

a grid plate mounted within said chamber;

granular material disposed within said chamber above said grid plate;

means for generating heat within the reactor;

means for blowing air through said granular material for fluidizing said granular material within said chamber whereby a freeboard area is provided within said chamber above the fluidized bed of granular material;

first temperature measuring means for measuring the temperature of said fluidized bed;

means responsive to the temperature of said fluidized bed for controlling the temperature of said fluidized bed;

second temperature measuring means for measuring the temperature of the freeboard area;

means for feeding material to be treated into said chamber; and means responsive to the temperature of said freeboard area for controlling the rate of feed of material to be treated supplied to said chamber.

4. The reactor of claim 3 further comprising means for continuously supplying air directly into said freeboard area.

5. The reactor of claim 4 wherein said means responsive to the temperature of the freeboard area includes means for comparing the temperature of the freeboard area to a predetermined temperature and means responsive to the temperature comparing means for controlling the rate of feed of material to be treated supplied to the reactor.

6. The reactor of claim 5 wherein the material to be treated is a combustible waste and said means for generating heat within the reactor includes means for supplying fuel to the fluidized bed and the combustible waste and the reactor further comprising means for supplying quench water to the fluidized bed and said means for controlling the temperature of the fluidized bed includes means for controlling the supply of fuel and quench water to the fluidized bed and said means for controlling the temperature of the freeboard area is operative independent of the means for controlling the temperature of the fluidized bed.

7. The method of incinerating wastes containing combustible material comprising the steps of providing a combustion chamber containing granular material; blowing a continuous supply of air into said granular material to provide a fluidized bed of granular material whereby a freeboard area is provided within said chamber above the fluidized bed; supplying fuel to the fluidized bed for combustion therein; supplying wastes to the chamber; measuring the temperature of the freeboard area; and controlling the rate of feed of wastes supplied to the chamber in response to the temperature of the freeboard area.

8. The method of claim 7 further comprising the step of continuously supplying air directly into the freeboard area of the chamber.

9. The method of claim 8 further comprising the step of comparing the temperature of the freeboard area to a predetermined temperature whereby the volume of wastes supplied to the chamber is controlled by the difference between the predetermined temperature and the actual temperature of the freeboard area.

10. The method of claim 9 further comprising the steps of supplying quench water to the chamber for reducing the temperature of the fluidized bed; measuring the temperature of the fluidized bed; and controlling the supply of fuel and quench water to the fluidized bed to the chamber in response to the temperature of the fluidized bed.

11. The method of claim 10 further comprising the step of comparing the temperature of the fluidized bed to a predetermined temperature and the supply of fuel and quench water is controlled by difference between the predetermined temperature and the actual temperature of the fluidized bed.

12. The method of claim 10 wherein the quench water is supplied to the chamber into the freeboard area at a point adjacent the surface of the fluidized bed.

References Cited
UNITED STATES PATENTS

| | | | |
|---|---|---|---|
| 3,319,587 | 5/1967 | Albertson et al. | 110—8 |
| 3,351,030 | 11/1967 | Albertson et al. | 110—7 |
| 3,366,080 | 1/1968 | Albertson | 110—8 |

KENNETH W. SPRAGUE, Primary Examiner